(12) United States Patent
Petersen et al.

(10) Patent No.: US 12,701,073 B1
(45) Date of Patent: Aug. 4, 2026

(54) SYSTEM, METHOD, AND NON-TRANSITORY COMPUTER-READABLE MEDIUM FOR FORWARDING DATA USING INGRESS PROCESSING WITH MULTICAST DATA REPLICATION

(71) Applicant: Ethernovia Inc., San Jose, CA (US)

(72) Inventors: Brian Arnold Petersen, San Francisco, CA (US); Tom Quoc Wellbaum, San Jose, CA (US)

(73) Assignee: Ethernovia Inc., San Jose, CA (US)

( * ) Notice: Subject to any disclaimer, the term of this patent is extended or adjusted under 35 U.S.C. 154(b) by 709 days.

(21) Appl. No.: 18/068,610

(22) Filed: Dec. 20, 2022

Related U.S. Application Data

(60) Provisional application No. 63/265,797, filed on Dec. 21, 2021.

(51) Int. Cl.
| | |
|---|---|
| *H04L 45/16* | (2022.01) |
| *H04L 12/18* | (2006.01) |
| *H04L 45/74* | (2022.01) |

(52) U.S. Cl.
CPC .............. *H04L 45/16* (2013.01); *H04L 12/18* (2013.01); *H04L 45/74* (2013.01)

(58) Field of Classification Search
CPC .......... H04L 45/16; H04L 12/18; H04L 45/74
See application file for complete search history.

(56) References Cited

U.S. PATENT DOCUMENTS

| | | | |
|---|---|---|---|
| 11,637,786 B1 * | 4/2023 | Matthews ........... | H04L 49/9089 370/235 |
| 2005/0141502 A1 * | 6/2005 | Kumar .................... | H04L 45/16 370/432 |
| 2016/0182666 A1 * | 6/2016 | Rathod ................... | H04L 51/48 709/218 |
| 2021/0160350 A1 * | 5/2021 | Volpe .................... | H04L 67/563 |
| 2021/0243253 A1 * | 8/2021 | Pang ................... | H04L 12/1854 |

* cited by examiner

*Primary Examiner* — Joseph E Avellino
*Assistant Examiner* — Adam Joel Cerlanek
(74) *Attorney, Agent, or Firm* — Schwegman, Lundberg & Woessner, P.A.

(57) ABSTRACT

Various embodiments described herein provide for forwarding multicast data units using ingress processing with multicast data replication, which can address or overcome some of the complexities and challenges faced by conventional data unit forwarding systems.

20 Claims, 7 Drawing Sheets

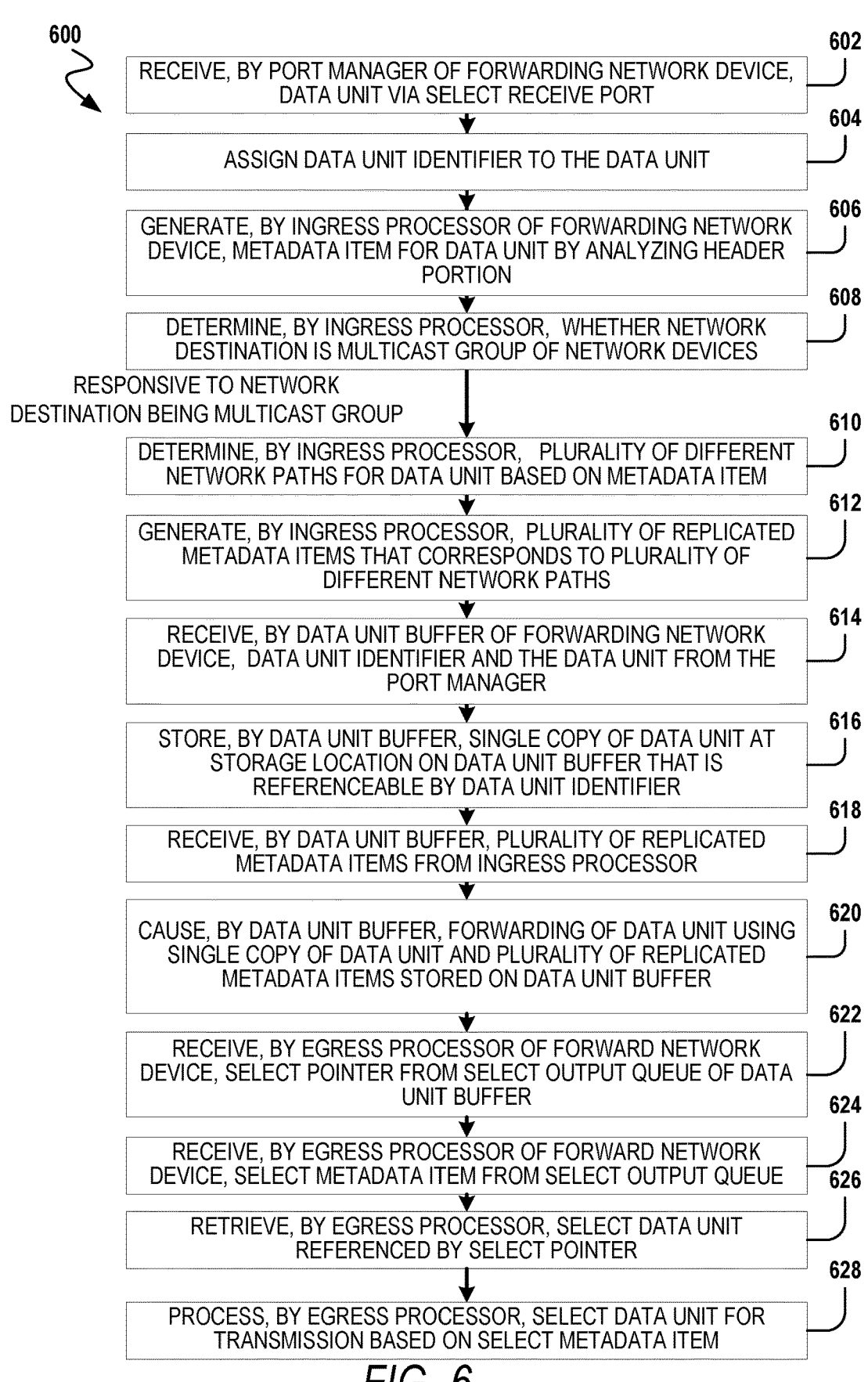

600

602
RECEIVE, BY PORT MANAGER OF FORWARDING NETWORK DEVICE, DATA UNIT VIA SELECT RECEIVE PORT

604
ASSIGN DATA UNIT IDENTIFIER TO THE DATA UNIT

606
GENERATE, BY INGRESS PROCESSOR OF FORWARDING NETWORK DEVICE, METADATA ITEM FOR DATA UNIT BY ANALYZING HEADER PORTION

608
DETERMINE, BY INGRESS PROCESSOR, WHETHER NETWORK DESTINATION IS MULTICAST GROUP OF NETWORK DEVICES

RESPONSIVE TO NETWORK DESTINATION BEING MULTICAST GROUP

610
DETERMINE, BY INGRESS PROCESSOR, PLURALITY OF DIFFERENT NETWORK PATHS FOR DATA UNIT BASED ON METADATA ITEM

612
GENERATE, BY INGRESS PROCESSOR, PLURALITY OF REPLICATED METADATA ITEMS THAT CORRESPONDS TO PLURALITY OF DIFFERENT NETWORK PATHS

614
RECEIVE, BY DATA UNIT BUFFER OF FORWARDING NETWORK DEVICE, DATA UNIT IDENTIFIER AND THE DATA UNIT FROM THE PORT MANAGER

616
STORE, BY DATA UNIT BUFFER, SINGLE COPY OF DATA UNIT AT STORAGE LOCATION ON DATA UNIT BUFFER THAT IS REFERENCEABLE BY DATA UNIT IDENTIFIER

618
RECEIVE, BY DATA UNIT BUFFER, PLURALITY OF REPLICATED METADATA ITEMS FROM INGRESS PROCESSOR

620
CAUSE, BY DATA UNIT BUFFER, FORWARDING OF DATA UNIT USING SINGLE COPY OF DATA UNIT AND PLURALITY OF REPLICATED METADATA ITEMS STORED ON DATA UNIT BUFFER

622
RECEIVE, BY EGRESS PROCESSOR OF FORWARD NETWORK DEVICE, SELECT POINTER FROM SELECT OUTPUT QUEUE OF DATA UNIT BUFFER

624
RECEIVE, BY EGRESS PROCESSOR OF FORWARD NETWORK DEVICE, SELECT METADATA ITEM FROM SELECT OUTPUT QUEUE

626
RETRIEVE, BY EGRESS PROCESSOR, SELECT DATA UNIT REFERENCED BY SELECT POINTER

628
PROCESS, BY EGRESS PROCESSOR, SELECT DATA UNIT FOR TRANSMISSION BASED ON SELECT METADATA ITEM

FIG. 6

SYSTEM, METHOD, AND NON-TRANSITORY COMPUTER-READABLE MEDIUM FOR FORWARDING DATA USING INGRESS PROCESSING WITH MULTICAST DATA REPLICATION

CROSS-REFERENCE TO RELATED APPLICATION

This application claims priority to and the benefit of U.S. Provisional Patent Application No. 63/265,797, filed on Dec. 21, 2021, which is incorporated herein by reference.

TECHNICAL FIELD

Embodiments described herein relate to data communications and, more particularly, to systems, methods, devices, and instructions relating to data forwarding using ingress processing of a multicast data unit with multicast data replication.

BACKGROUND

Communications networks allow for the exchange of data between various interconnected network devices. Data transmitted from one network device to another is a broken into smaller data units (e.g., data packet, data frames), which are each transmitted separately along a network path, over a data link, to their network destination. Each data unit can, for example, comprise an ordered set of individual values, such as a binary number made up of an ordered set of zeroes and ones (e.g., 0001, 0010, etc.) or contiguous groups of eight binary digits (bytes). The data units can be generated using various communication protocols or standards (e.g., Ethernet, Internet Protocol, (IP), User Datagram Protocol (UDP)) that define the rules, syntax and semantics for arranging a data unit. For example, a communication protocol may define a length of the data unit (e.g., number of individual values (bytes)), as well as identify the types of data that are to be stored in the various positions of the data unit, such as identifying the range of bytes (e.g., bytes 0-127) that store header data (e.g., one or more headers), transferred data (e.g., payload), or trailer. A header can comprise data used to deliver a data unit to its intended network destination, where such data can include data identifying the data unit type (e.g., the communication protocol used to generate the data unit), a source network address, a destination network address, and the like. Multiple communication protocols can be used to transmit data through use of data encapsulation. Encapsulation is a method in which a data unit generated using one communication protocol is stored as the payload of a data unit generated using a different communication protocol or another instance of the same protocol. The header type of the outermost header defines the data unit type of the data unit. In some cases, a data unit may be encapsulated multiple times resulting in a data unit that is encapsulated in multiple layers of headers.

Certain devices in a communications network, such as bridges, routers, switches, implement a data unit forwarding system that forwards a received data unit, such as a data packet (or packet), to another network device. Generally, a data unit forwarding system receives a data unit, and examines one or more headers of the received data unit, and transmits the received data unit via an appropriate set of transmit ports (e.g., output network ports) based on the examination.

BRIEF DESCRIPTION OF THE DRAWINGS

Various ones of the appended drawings merely illustrate example embodiments of the present disclosure and should not be considered as limiting its scope.

FIG. 6 is a flowchart illustrating an example method for forwarding multicast data units using ingress processing with multicast data replication, in accordance with some embodiments.

DETAILED DESCRIPTION

Figure 1:
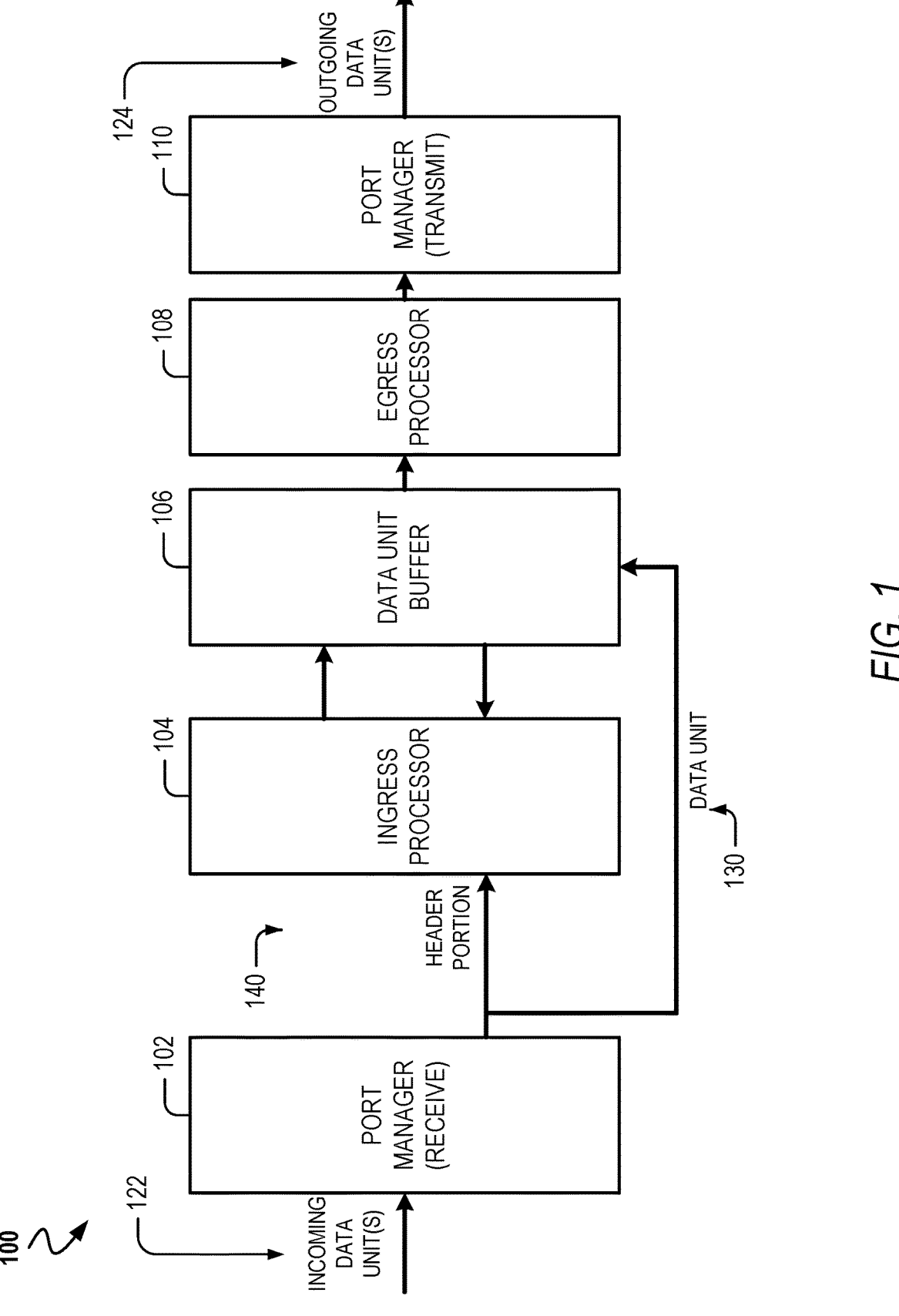
FIG. 1 is a block diagram illustrating an example data unit forwarding system that supports forwarding multicast data units using ingress processing with multicast data replication, in accordance with some embodiments.

As noted, a data unit forwarding system receives a data unit, examines one or more headers of the received data unit, and transmits the received data unit via an appropriate set of transmit ports (e.g., output network ports) based on the examination. Typically, a data unit forwarding system also supports multicast data unit (e.g., multicast data packet) forwarding, where a single copy of a multicast data unit is received by the data unit forwarding system and two or more copies of that data unit (e.g., with or without per-copy modifications) are transmitted from the data unit forwarding system.

Conventional multicast data unit forwarding involves a number of complexities during forwarding operations, including growth in data unit storage used and data unit forwarding bandwidth available. For instance, if a conventional data unit forwarding system spawns a single multicast data unit to 20 copies, then the storage space required in the conventional data unit forwarding system to enqueue the data unit copies prior to transmission increases by 20 times and the bandwidth associated with the data unit (e.g., bits per second) would also increase by 20 times.

Another complexity faced by a conventional multicast data unit forwarding is that copies of multicast data units are not necessarily identical. For example, if a data unit is multicast at the data layer/layer 2 (e.g., Ethernet bridging), then all of the copies of the data unit are transmitted onto the same VLAN (virtual local area network) as was used (by the conventional multicast data unit forwarding) to receive the data unit. However, each network segment (that includes a network device from the multicast group) may cause a data unit's VLAN to map to a different VLAN identifier value on each transmit port (or output port). If a data unit is multicast at the network layer/layer 3 (e.g., Internet Protocol version 4 (IPv4) or Internet Protocol version 6 (IPv6) routing), then the Ethernet MAC (Media Access Control) source address, destination address, and likely VLAN ID for each copy of the data unit, will be different. It is possible for some copies of the data unit to be bridged to some ports while other copies of the data unit are to be routed. Additionally, some copies of the data unit can enter networking tunnels with their own encapsulation methodologies.

Yet another complexity is that for certain networking standards, such as Ethernet bridging standards, data units within a flow should be forwarded in the order in which they are received. On the other hand, other network standards (e.g., IP routing standards) have no such requirement. From a practical/commercial standpoint, it is generally accepted that data units within a flow are forwarded in order regardless of the forwarding method. As used herein, a data flow (or flow) of data units is a collection of receive context and addressing information associated with data units. A data unit's membership to a flow may be approximate. It is permissible to group a number of discrete flows of packets together into a single flow, while it is not permissible to distribute packets of an indivisible flow into two or more separate flows. Conventional processing methods can take varying amounts of time to complete for data units that belong to the same flow and, as such, these data units are allowed to drift out of order during ingress packet processing in order to maximize processing efficiency. These temporarily out-of-order data units can be re-ordered; which can be more complex when considering multicast replication.

Various embodiments described herein provide for forwarding multicast data units using ingress processing with multicast data replication, which can address or overcome some of the complexities and challenges faced by conventional data unit forwarding systems. According to various embodiments, a system (e.g., data unit forwarding system) comprises one or more of a port manager, an ingress processor, a data unit buffer, and an egress processor. The port manager can comprise a set of receive ports (or input ports) to receive data units from a transmitting network device, and the port manager can be configured to receive a data unit via a select receive port of the set of receive ports and to assign a data unit identifier to the data unit, where the data unit comprises a header portion (e.g., header byte string) and a non-header portion (e.g., body or payload portion of the data unit). An ingress processor can be configured to perform operations that facilitate forwarding of the received data unit (e.g., unicast or multicast data unit) to one or more network segments that include at least one of the received data unit's network destinations (e.g., end-point network devices), where the operations can include multicast replication in accordance with various embodiments described herein. For example, the operations can comprise the ingress processor receiving the data unit identifier and the header portion of the data unit from the port manager, and generating a metadata item for the data unit by analyzing the header portion, where the metadata item describes a network destination of the data unit and the metadata item comprises the data unit identifier. The ingress processor can determine whether the network destination is a multicast group of network devices. In response to determining the network destination is a multicast group, the ingress processor can determine a plurality of different network paths based on the metadata item, where each different network path comprises information for forwarding the data unit to at least one network device in the multicast group. Additionally, in response, the ingress processor can generate, for the data unit, a plurality of replicated metadata items that corresponds to the plurality of different network paths (i.e., one replicated metadata item for each different network path), where each replicated metadata item represents a copy of the metadata item that is updated based on a corresponding network path in the plurality of different network paths. For instance, for an individual processing path, a copy of the metadata item can be updated (e.g., modified) to reflect specific parameters associated with that individual processing path, thereby resulting in the replicated metadata item corresponding to the individual processing path. In this way, the ingress processor of an embodiment can perform a separate, per-copy sequences of instructions on each copy of the metadata item generated by the ingress processor. Such per-copy sequence of instructions can enable separate load balancing, transmit port (or output queue) selection (e.g., in a data unit buffer), and encapsulation for each copy of a multicast data unit (or any other type of multi-destination packet).

Eventually, the ingress processor can provide the plurality of replicated metadata items to a data unit buffer to facilitate forwarding of the data unit. For some embodiments, the ingress processor generates each separate metadata item of the plurality of replicated metadata items iteratively and, as such, the ingress processor can serially deliver each separate metadata item of the plurality of replicated metadata items to the data unit buffer as the separate metadata item is generated by ingress processor. For instance, after generating a first replicated metadata item of the plurality of replicated metadata items, the ingress processor can deliver the first replicated metadata item to the data unit buffer prior to generating a next (second) replicated metadata item of the plurality of replicated metadata items.

For some embodiments, the ingress processor can process and generate pluralities of metadata items for different data units in parallel, where the different data units can be associated with a same data flow (e.g., received via the same receive port). For instance, two consecutive data units (a first data unit and a second data units) can be received by the forwarding network device via the same receive port, and each can be provided to the ingress processor for parallel processing. It may be the case that all of replicated metadata items for the second data unit complete generation (by the ingress processor) prior to all of replicated metadata items for the first data unit has completed generation. For some embodiments, the ingress processor comprises a data unit reorder component that reorders delivery of metadata items (e.g., using one or more queues) such that metadata items of the second data unit are not delivered to the data unit buffer prior to the metadata items of the first data unit being delivered to the data unit buffer. The data unit reorder component can be configured to serially receive each separate metadata item of the plurality of replicated metadata items as it is generated by ingress processor. The data unit reorder component can queue a (serially) received metadata item according to a receive port associated with the received metadata item, and then queue the serially received metadata item according to a multicast index value associated with the serially received metadata item.

For some embodiments, the data unit buffer is configured to receive the data unit identifier and the data unit from the port manager, to store a single copy of the data unit at a storage location on the data unit buffer that is referenceable by the data unit identifier, and to receive (e.g., serially) the plurality of replicated metadata items from the ingress processor. Eventually, the data unit buffer of an embodiment can cause forwarding of the data unit using the single copy of the data unit and the plurality of replicated metadata items stored on the data unit buffer. For example, the data unit buffer can cause the forwarding of the data unit by performing a set of operations for each individual metadata item of the plurality of replicated metadata items (e.g., as they are serially received from the ingress processor). For instance, the data unit buffer can determine, based on the individual metadata item, an individual output queue of the set of output queues. In this way, processing outcomes of the ingress processor can direct how metadata items to the previously-stored data units are enqueued into one or more available output queues. The data unit buffer can queue (or enqueue) the individual metadata item in the individual output queue, where the data unit identifier of the individual metadata item associates the individual metadata item with the data unit stored at the storage location. The data unit buffer can queue an individual pointer to the storage location of the single copy of the data unit in the individual output queue, where the queued individual metadata item and the queued pointer enable forwarding of a copy of the data unit based on the queued individual metadata item (e.g., via the egress processor).

For some embodiments, the egress processor is configured to receive a select pointer from a select output queue of the data unit buffer, to receive a select metadata item from the select output queue, to retrieve a select data unit referenced by the select pointer, and to process the select data unit for transmission based on the select metadata item. Additionally, for some embodiments, the port manager comprises a set of transmit ports, and the egress processor processes the select data unit for transmission based on the select metadata item by providing the select data unit to the port manager to be transmitted via a select transmit port in the set of transmit ports.

A data forwarding systems of some embodiments stores complete data units (e.g., data packets) in a data unit buffer (e.g., a centralized packet buffer) as the data units are received by the data forwarding system. Additionally, the header portion (e.g., first several bytes) of each data unit can be copied into a data unit, ingress processing pipeline in order to make forwarding (and other) determinations for the data units.

As used herein, a data unit can comprise a data packet (or packet) or a data frame, either of which can be defined in accordance with a network standard or protocol (e.g., defined by IEEE network standard, such as Ethernet). A data unit can be divided into a header portion that comprises header data, and a non-header portion (e.g., body or payload portion) that comprises non-header data, such payload data.

The data unit forwarding system of various embodiments is a protocol-independent data unit forwarding system and can be configured to process and forward data units of various communication protocol types, such as Ethernet, Internet Protocol (IP), IP version 4 (IPv4), IP version 6 (IPv6), User Datagram Protocol (UDP), Audio Video Transport Protocol (AVTP), and the like. The data unit forwarding system of various embodiments comprise a plurality of functional components that provide functionality to properly process and forward a data unit to its intended network destination. For instance, the functional components can provide functionality such as interpreting headers included in a data unit, identifying a data unit's network destination, re-encapsulating the payload as needed, and the like. The functional components can be communication protocol type agnostic, meaning that the functional components can use a common set of operations, logic, templates, or tables to process a data unit regardless of its communication protocol type. Accordingly, the protocol independent data unit forwarding system can process different types of data units or can forward data units in different types of network segments.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example data unit forwarding system 100 that supports forwarding multicast data units using ingress processing with multicast data replication, in accordance with some embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. For some embodiments, various additional functional components are supported by the data unit forwarding system 100 to facilitate additional functionality that is not specifically described herein.

Referring now to FIG. 1, the data unit forwarding system 100 can be part of (e.g., implemented as part of) a network device operatively coupled to one or more network devices over one or more data links (e.g., Ethernet data links). For instance, the data unit forwarding system 100 can be implemented on the network device, at least in part, by a physical layer network device of the network device. A network device can be of any of a variety of types of devices capable of network communication with other network devices. Examples of network devices can include, without limitation, a computing device (e.g., laptop or mobile device), a bridge, a router, a network switch, or the like. The data unit forwarding system 100 can provide for (or otherwise facilitate) the exchange of data units between various interconnected network devices. For instance, a network device can include some or all of the features, components, and peripherals of the machine 700 shown in FIG. 7.

As shown, the data unit forwarding system 100 comprises multiple components (e.g., functional components) coupled in series to provide a data processing pipeline for data unit forwarding, which can support forwarding multicast data units using ingress processing with multicast data replication as described herein. Each component can be a physical data processing element configured to perform one or more data processing functions based on received input data. A functional component can generate a data output, which can be provided as input into other functional components in the data processing pipeline. In FIG. 1, the data unit forwarding system 100 comprises a port manager 102 for receiving one or more data units (e.g., received data units), an ingress processor 104, a data unit buffer 106, an egress processor 108, and a port manager 110 for transmitting one or more data units (e.g., forwarded data units).

For some embodiments, the port manager 102 supports one or more Media Access Controllers (MACs) and operates to receive, via one or more receive ports (e.g., external network port), one or more incoming data units 122 transmitted to the data unit forwarding system 100 over a data link. The receive ports can include, without limitation, Ethernet and specialty ports, such as Camera Serial Interface (CSI), Controller Area Network (CAN), Local Interconnect Network (LIN), and the like. Each receive port can be identified by a unique port identifier.

After receiving a data unit (e.g., via a receive port), receive port manager 102 can perform a one or more data processing operations to generate an output that can be provided to the other functional components of the data unit forwarding system 100. For instance, the port manager 102 can initially perform any media specific adaptations on the received data unit as well as multiplex the data units of receive ports to a multiplexed path of the data processing pipeline such that the data unit, or any portion, thereof may be transmitted to the other downstream functional components of the data unit forwarding system 100.

After multiplexing the data unit, the port manager 102 can identify header data of a data unit. For some embodiments, the header data comprises a header byte string, which can include a subset of the ordered set of individual values (e.g., bytes) from the data unit. For instance, the header byte string can include a predetermined number of the first ordered values (e.g., first n bytes) from the data unit. The predetermined number may be any number that is less than or equal to the total number of values in the data unit. Additionally, the predetermined number used can be selected to encompass all relevant header data included in the data unit, while remaining small enough that the size of the header byte string does not provide undue burden during subsequent processing of the header byte string.

Eventually, the port manager 102 can provide data to the ingress processor 104 and the data unit buffer 106 (e.g., packet buffer) via one or more data paths. As shown, from the data units 122 received by the port manager 102, the port manager 102 provides the ingress processor 104 with at least a header portion 140 (e.g., header byte string) of a data unit received by the port manager 102, and provides the data unit buffer 106 with the entire the data unit 130. For some embodiments, the port manager 102 provides the ingress processor 104 with the header portion 140 while the data unit is still being received. Depending on the embodiment, the port manager 102 can either provide the ingress processor 104 with the header portion 140 (in its entirety) after at least the header portion 140 is completely received by the port manager 102 or start providing the header portion 140 to the ingress processor 104 as the header portion 140 is still being received. Additionally, depending on the embodiment, the port manager 102 can either provide the data unit buffer 106 with the entire data unit 130 after the data unit 130 is received in its entirety (e.g., completely received) by the port manager 102, or start providing the data unit 130 to the data unit buffer 106 as the data unit 130 is still being received by the port manager 102.

For some embodiments, the port manager 102 generates a metadata item for the data unit that describes the context of the data unit. For example, the metadata item includes a series of values that describe a context of the data unit that can be used by one or more functional components of the data unit forwarding system 100 to process the data unit. For instance, a functional component of the data unit forwarding system 100 can use the values in the metadata item to determine which operation the functional component is to perform to process the data unit. Additionally, as an individual operation is performed, the metadata item for the data unit can be updated to further define the context of the data unit. For example, the metadata item of the data unit can be updated by the ingress processor 104 (based on the resulting output of an operation the ingress processor 104) performs by adding new values to the metadata item, modifying existing values in the metadata item, and the like. The port manager 102 can configure some initial data values in the metadata item. For instance, the port manager 102 can include one or more data values in the metadata item, which can for example identify the port via which the data unit was received (e.g., unique port identifier), a data length of the data unit (e.g., byte count), a time stamp of the time at which the data unit was received, or data identifying any errors that may have been detected during reception of the data unit. Though not illustrated, for some embodiments, the port manager 102 provides the ingress processor 104, the data unit buffer 106, or both with the metadata item for a data unit. For example, the port manager 102 can provide the ingress processor 104 with a metadata item of a data unit and the header portion 140 of the data unit, the ingress processor 104 can process the header portion 140 and generate an updated metadata item based on that processing, and the ingress processor 104 can provide (as output) the updated metadata item to the data unit buffer 106, which can queue the data unit (it received from the port manager 102) based on the updated metadata item received from the ingress processor 104.

According to various embodiments, the ingress processor 104 and the data unit buffer 106 are configured to perform one or more specific operations to support multicast data unit forwarding using ingress processing with multicast data replication. Depending on the embodiment, the ingress processor 104 can perform one or more of parsing, decapsultion, lookup, or forwarding decision operations based on the header portion 140 received from the port manager 102. More regarding the ingress processor 104 and the data unit buffer 106 is discussed with respect to FIGS. 2 and 3, which describe and illustrate an example implementation of the ingress processor 104 in accordance with some embodiments.

For some embodiments, the data unit buffer 106 provides temporary storage and queuing for data units while the data unit waits for processing by the ingress processor 104 to complete (e.g., based on the header portion 140). For instance, the data unit buffer 106 of some embodiments provides temporary storage of a multicast data unit while replicated metadata items are generated and provided by the ingress processor 104 to the data unit buffer 106. Additionally, the data unit buffer 106 can queue a given data unit until a queuing scheduling algorithm (e.g., of the data unit buffer 106) can service the data unit queue. For some embodiments, the data unit buffer 106 interacts with the ingress processor 104 to manage the resources of the data unit buffer 106. For instance, based on a queue selection process performed on the data unit based on the header portion 140, the ingress processor 104 can select a queue in the data unit buffer 106 for a metadata item of a data unit (e.g., replicated metadata item for a multicast data unit), and during that process the ingress processor 104 can query the data unit buffer 106 for a state of the selected queue. Eventually, a metadata item (e.g., replicated metadata item) provided by the ingress processor 104 can include information relating to the queue selected by the ingress processor 104. The data unit buffer 106 can link stored data units (e.g., stored multicast data units) to metadata items (e.g., replicated metadata items) provided by the ingress processor 104.

For some embodiments, the egress processor 108 accepts one or more data units from the data unit buffer 106 (e.g., as a stream of interlaced data units based on a queue) and performs one or more operations for preparing the data units for output (e.g., egress or transmission) from the data unit forwarding system 100. The one or more operations performed by the egress processor 108 can include re-encapsulation of a forwarded data unit. For various embodiments, the egress processor 108 provides (e.g., delivers) one or more data units to the port manager 110 (for transmitting data units), which can transmit the one or more data units (as outgoing data unit(s) 124) from the data units forwarding system 100 via one or more transmission ports, thereby forwarding the data unit to its next network destination.

Figure 2:
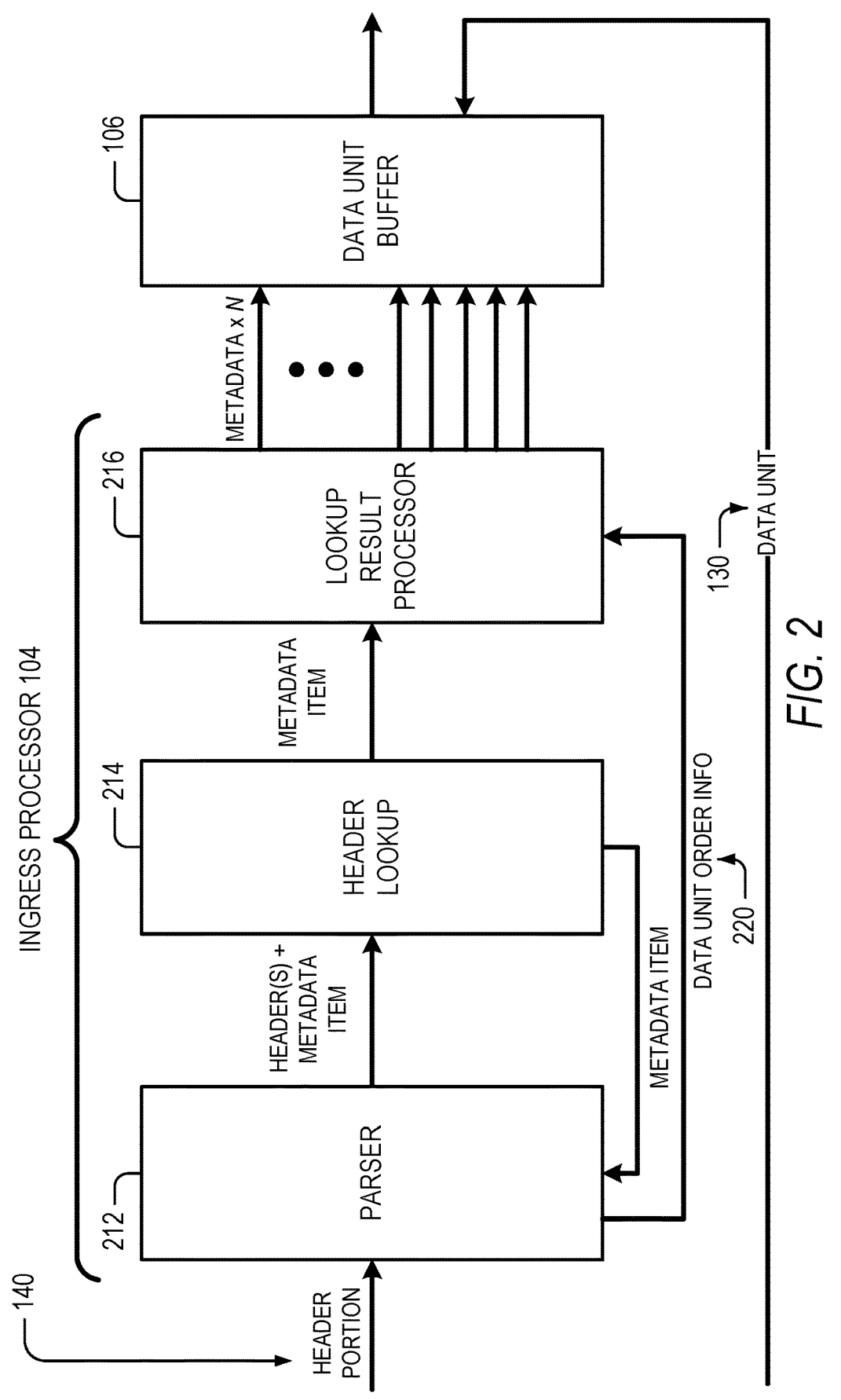
FIG. 2 is a block diagram illustrating an example implementation of an ingress processor that supports forwarding multicast data units using ingress processing with multicast data replication, in accordance with some embodiments.

FIG. 2 is a block diagram illustrating an example implementation of the ingress processor 104 that supports forwarding multicast data units using ingress processing with multicast data replication, in accordance with some embodiments. As shown, the ingress processor 104 comprises a parser 212, a header lookup 214, and a lookup result processor 216. The ingress processor 104 receives a header portion (e.g., 140) of the data unit (e.g., from the port manager 102 of) the data unit forwarding system 100, and the data unit buffer 106 receives (e.g., from the port manager 102) the data unit (e.g., 122) that is received by the data unit forwarding system 100. In addition to the header portion, the ingress processor 104, the data unit buffer 106, or both can receive a data unit identifier (e.g., packet identifier value) for the data unit, which can be assigned by the port manager (e.g., 102) and provided to the data unit buffer 106 by the port manager (e.g., 102). The storage location of the data unit can be noted by the data unit buffer 106, and the data unit buffer 106 can reference the storage location by the data unit identifier of the data unit. The header portion (e.g., 104) received by the ingress processor 104 can be provided to the parser 212, and the data unit identifier received by the ingress processor 104 (e.g., from the port manager 102) can also be provided to the parser 212. The parser 212 can analyze data (e.g., header byte string) from the header portion (e.g., the structure of the header data) and can provide as a metadata item for the data unit to the header lookup 214, where the metadata item comprises one or more of a description of headers described by the data, a copy of the data (e.g., header byte string), or other aspects of the data unit. Additionally, the parser 212 can deliver a data unit order information 220, which can include a data unit's identifier, to the reorder function of the lookup result processor 216 in order to establish the receive order of data units. According to some embodiments, where the data units is a multicast data unit, this metadata item is considered the original metadata item from which the ingress processor 104 generates (e.g., replicates) multiple copies (also referred to herein as multicast copies) of metadata items to facilitate forwarding of the multicast data units to one or more of its network destinations via one or more different network paths. For various embodiments, each copy of metadata item generated eventually is provided to the data unit buffer 106, and each of those copies causes the data unit buffer 106 to generate a copy of the data units (the received multicast data unit) to be transmitted (e.g., via the egress processor 108 and the port manager 110).

For some embodiments, the header lookup 214 is configured to determine the data unit's network destination. The header lookup 214 can use a single, flexible search argument assembly and lookup operation (hereafter, lookup operation) to support the various operations performed by the header lookup 214. Such various operations can include refining the data unit's context (e.g., updating the metadata item), managing the contents of forwarding tables, testing the data unit against access control lists, determining the data unit's destination and/or forwarding requirements, hashing flow-identifying entropy for load balancing purposes, and the like. The parser 212 can provide (e.g., via the metadata item) non-enumerated layer type values to the header lookup 214. The header lookup 214 can generate one or more search arguments based on such values and use the one or more search arguments to perform one or more (header) lookup operations in tables that hold keys that are compatible with the assembled search arguments. For instance, the header lookup 214 can use data included in the metadata item (or updated metadata item) to retrieve sets of parameters that are used to configure bit-field extractors. Examples of data included in the metadata item include layer type values, layer offset values, port identifier for a physical receive port, port identifier for a logical receive port, layer 2 forwarding domain, layer 3 forwarding domain, header type, quality of service code points (e.g., priority), address value type (e.g., unicast, multicast, etc.), and the like. The configured bit-field extractors are then used to concatenate arbitrary strings of header data into the search arguments, which are used to perform the lookup operations.

Different types of lookup operations (e.g., search algorithms) can be used by the header lookup 214 for different purposes. For instance, an indexed read lookup operation may be used to map a data unit's port identifier to the destination identifier. As another example, an exact-match search lookup operation may be used to bridge Ethernet data units (e.g., Ethernet packets) based on their headers. As another example, a longest-prefix match lookup operation may be used to route data based on their headers (e.g., IPv4 or IPv6). Generation of search arguments and performing lookup operations in this manner enables the header lookup 214 to operate freely of fixed relationships between a data unit's forwarding header type, forwarding method, or the lookup algorithms used to make forwarding or other decisions based on header contents.

Additionally, to determine a data unit's network destination, the header lookup 214, if necessary, can recirculate the data unit's metadata item back to the parser 212, where further headers can be examined, and the lookup process repeated on different data. In this way, the parser 212 and the header lookup 214 can submit one or more header fields and metadata in various combinations to perform one or more lookups. For example, the parser 212 and the header lookup 214 can work together to process the data from the header portion (e.g., 104) header-by-header, where each pass through a header processing loop (not shown) performed by the parser 212 and header lookup 214 processes or "consumes" a single layer of headers. In each pass through the header processing loop, the parser 212 can provide the header lookup 214 with an updated metadata item that includes data describing a subsequent layer of headers included in the data unit, such as the header types and range pair for each header in the layer of headers. In turn, the header lookup 214 can further process the data unit based on the subsequent layer of headers. Eventually, the header lookup 214 can deliver to the lookup result processor 216 an updated metadata item that describes a representation of the data unit's destination.

Prior to providing an update metadata item to the lookup result processor 216, the header lookup 214 can determine a first forwarding instruction to be performed to forward the data unit to its network destination. The header lookup 214 can determine the first forwarding instruction during performance of the lookup operations (described above) by the header lookup 214. The header lookup 214 can provide the lookup result processor 216 with data identifying the first forwarding instruction, such as by updating the metadata item to include a value that points to the first instruction. This can be performed using an action instruction that is returned as a result of a destination-determining lookup operation. Similarly, other methods for setting the value that points to the first instruction can also be used.

For some embodiments, the lookup result processor 216 uses one or more values provided by the updated metadata item (from the header lookup 214) that point to instructions for determining a forwarding decision, where the instructions can include multicast replication as described herein. A number of other functions can be performed by the lookup result processor 216, such as selecting one or more queues (e.g., output queues) in the data unit buffer 106 for receiving replicated metadata items for a multicast data unit to be forwarded. Alternatively, the forwarding decision can be limited to identifying the transmit port to be used to forward the data unit to its intended network destination. Depending on the embodiment, a single transmit port can be served by multiple queues in the data unit buffer 106, each with its own relative priority, bandwidth limits, and other quality of service-related characteristics. After identifying the transmit port for the data unit, the lookup result processor 216 can use data included in the updated metadata item (e.g., the context of the data unit) provided by the header lookup 214 and values conveyed by its priority related field to select one of the queues of the data unit buffer 106 that service the transmit port. After the queue is selected, the data unit can be ready to be enqueued by the data unit buffer 106 to the output queue for eventual transmission of the data unit.

According to some embodiments, the lookup result processor 216 receives the updated metadata item from the header lookup 214 and determines, based on the updated metadata item, whether the data unit's network destination is a multicast group of network devices (e.g., the data unit's destination comprises a multicast network address associated with the multicast group). In response to the data unit's network destination being a multicast group of network devices, the lookup result processor 216 can execute a multicast branch operation (e.g., a BranchMulticast instruction), which generates multiple copies (e.g., N number of copies) of the updated metadata item, where each copy facilitates forwarding of the data unit through a different network path to reach one of the network device in the multicast group (e.g., different network path to a different network segment that includes at least one network device of the multicast group). Accordingly, for some embodiments, each copy of the updated metadata item generated by the lookup result processor 216 for the data unit (e.g., single data packet) is modified (e.g., further updated) by the lookup result processor 216 to facilitate forwarding of the data unit through one of the different network paths. As a result, each copy of the updated metadata item delivered can be different from the other copies. The differences between the copies (resulting from the modification) can include, for example, output queue designations, tunnel encapsulation indices, and the like. Eventually, the multiple copies of the updated metadata item generated are delivered to the data unit buffer 106 by the lookup result processor 216. The multiple copies of the updated metadata item are illustrated in FIG. 2 by the multiple lines extending from the lookup result processor 216 to the data unit buffer 106. For some embodiments, the copies of the updated metadata item are delivered serially (e.g., one copy at a time) over a period of time (e.g., short period of time). The copies of the updated metadata item can represent a set of metadata items for the data unit. More regarding an example of the lookup result processor 216 is described and illustrated with respect to FIG. 3.

For some embodiments, the data unit buffer 106 receives the copies of the metadata item from the lookup result processor 216, and the data unit buffer 106 uses the data unit identifier (of the data unit) included in the copies of the metadata item to associate the copies to the data unit that was previously received and stored by the data unit buffer 106. According to some embodiments, the data unit buffer

106 receives each individual copy of the metadata item, determines a select queue in the plurality of output queues of the data unit buffer 106 (e.g., each output queue associated with a different transmit port of the port manager 110) for the individual copy based on information included in the individual copy (e.g., output queue selection information), and queues the individual copy and a pointer to a storage location of the data unit stored by the data buffer 106. Eventually, when the data unit is to be transmitted from the data forwarding system (e.g., 100) using different network paths, the pointer and the copy of the metadata item can be retrieved (e.g., by the egress processor 108) from the select queue, a copy of the data unit can be retrieved (e.g., by the egress processor 108) from the storage location using the pointer, and the retrieved copy of metadata item can be used (e.g., by the egress processor 108) to process the retrieved data unit for transmission using a transmit port (e.g., the transmit port managed by the port manager 110 and associated with the select queue).

Figure 3:
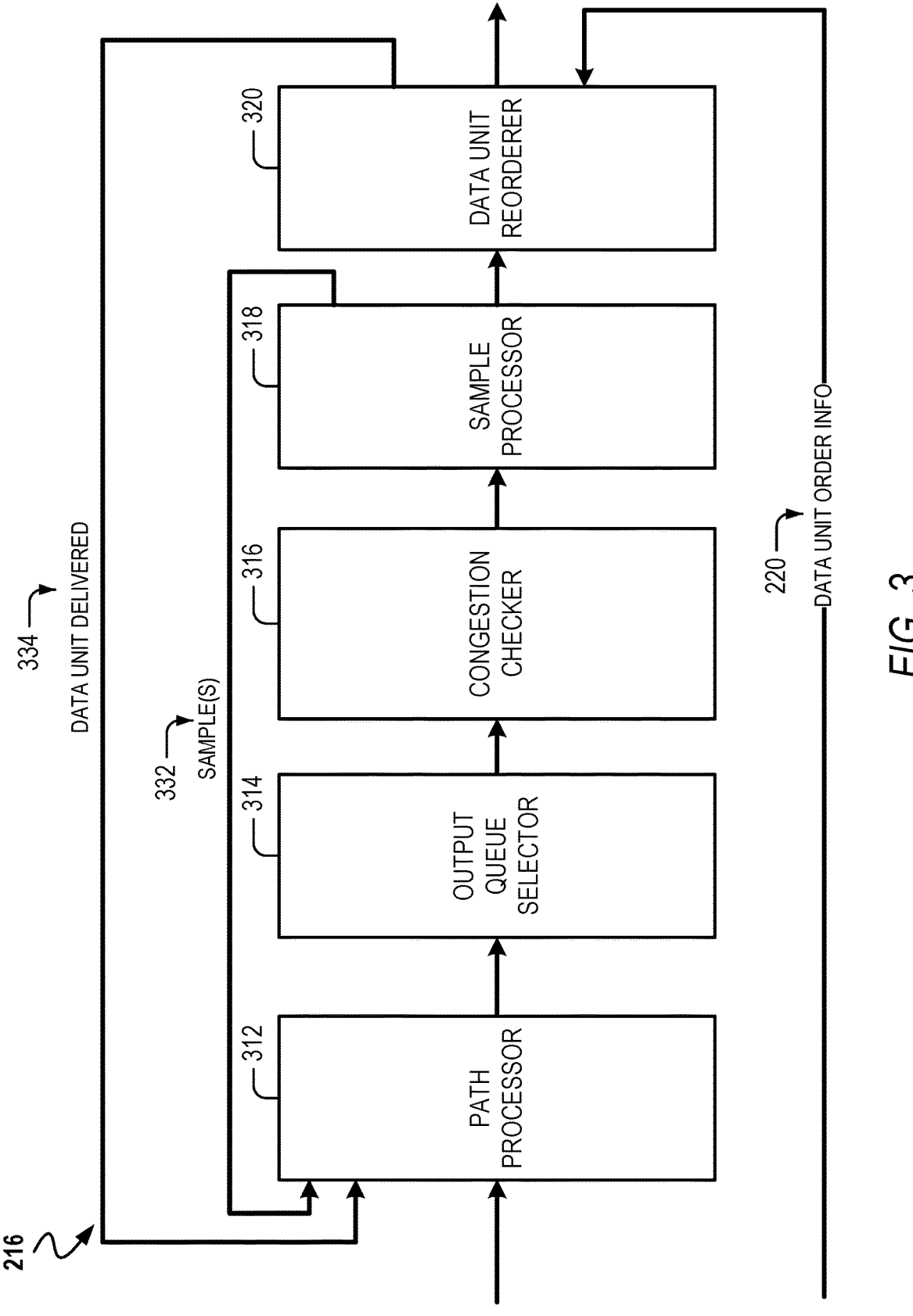
FIG. 3 is a block diagram illustrating an example implementation of a lookup result processor that supports forwarding multicast data units using ingress processing with multicast data replication, in accordance with some embodiments.

FIG. 3 is a block diagram illustrating an example implementation of the lookup result processor 216 that supports forwarding multicast data units using ingress processing with multicast data replication, in accordance with some embodiments. As shown, the lookup result processor 216 comprises a path processor 312, an output queue selector 314, a congestion checker 316, a sample processor 318, and a data unit reorderer 320. The lookup result processor 216 receives a metadata item (e.g., updated metadata item) of the data unit (e.g., from the header lookup 214 of) the ingress processor (e.g., 104). Based on the received metadata item, the path processor 312 can perform one or more instructions to determine one or more network paths (e.g., each network path comprising a specific port, a specific network connection, a specific encapsulation, etc.) that the data unit (associated with the metadata item) can follow in order to get closer to one or more end-point network destinations (e.g., network devices of the multicast group). Where the path processor 312 determines (based on the metadata item) that the data unit is a multicast data unit, the path processor 312 can execute a specific instruction (hereafter, referred to as a branch multicast instruction) that causes generation a copy of the metadata item for each different network path determined by the path processor 312. The branch multicast instruction can execute one of a list of blocks of code, making a new copy of the metadata item with each branch. Additionally, the branch multicast instruction can branch unconditionally to all of the specified instruction addresses in a list; making a unique copy of the metadata item for each branch. The following is an example structure of the branch multicast instruction.

```
branchWidth=4'd6//24 bits
struct BranchMulticast {
    branchType
    listBaseAddress
    listSize
}
```

Descriptions of the parameters for the branch multicast instruction are described below in Table 1.

| Parameter | Description |
| --- | --- |
| branchType | Identifies the current branch instruction. |
| listBaseAddress | The base address of the list of path branch pointers. |
| listSize | The number of path branch pointers in the list. |

The branch multicast instruction can make copies of the received metadata item and branches to separate, per-copy sequences of instructions for processing (e.g., updating) the copy of the metadata item according to one of the determined network paths. Accordingly, each branch is performed for a different network path determined by the path processor 312. In doing so, various embodiments enable separate load balancing, transmit port selection (e.g., via selection of the output queue of the data unit buffer associated with the transmit port), and encapsulation for each copy of the metadata item. The list described by the listBaseAddress and listSize parameters provide branch-to addresses. The listSize can reflect the number of different network paths determined by the path processor 312 and, thus, the number of copies of the metadata item that are ultimately generated. The path processor 312 can effectively treat each branch-to addresses as a special-purpose subroutines. The branch multicast instruction can branch to one of the code paths specified in the list of branch-to addresses, and each of these code paths can eventually be terminated by instruction (e.g., a BranchFinal instruction). When the branch multicast instruction is pending (i.e., there are still further multicast copies of the metadata item to make), the branch multicast instruction can deliver the multicast copy to the output queue selector 314 and returns to the branch multicast instruction. The branch multicast instruction can remain dormant (for the current data unit identifier) while it awaits an indication that the just-created copy of the metadata item has been delivered to the data unit buffer (e.g., 106) by the lookup result processor 216. At that point, the branch multicast instruction can take a next branch in the list.

All of the copies of the metadata item of the data unit generated by a branch multicast instruction can use (e.g., include) the data unit identifier of the data unit. Additionally, for some embodiments, only one copy of the metadata item exists in the lookup result processor 216 at a given time, and each copy is delivered to the data unit buffer (e.g., 106) before a next copy of the metadata item is generated. As shown, the data unit reorderer 320 can inform the path processor 312 when a copy is delivered to the data unit buffer (via a data unit delivered 334 signal) and, in response, branch multicast instruction can generate a next copy of the metadata item. For some embodiments, the data unit reorderer 320 is informed of a data unit's multicast replication radix (i.e., the number of copies of the metadata item to be generated by the path processor 312) by the branch multicast instruction. For instance, the branch multicast instruction can set a parameter in the copy of the metadata item (e.g., multicastRadix parameter in newHeaderInfo) equal to the branch multicast instruction's listSize parameter and, then the data unit reorderer 320 can interpret the parameter (e.g., multicastRadix) when the copy is eventually received by the data unit reorderer 320.

For some embodiments, the output queue selector 314 receives a copy of the metadata item generated by the path processor 312 and determines (e.g., selects) an output queue of the data unit buffer (e.g., 106) in which the copy will queued when the copy is ultimately provided (e.g., delivered) to the data unit buffer. The output queue selector 314 can update the copy of the metadata item to include information regarding the output queue selection for the copy, and provide the updated copy of the metadata item to a next stage of the lookup result processor 216. For some embodiments, the congestion checker 316 determines whether the output queue selected, by the output queue selector 314, is available to receive the updated copy of the metadata item.

For some embodiments, the sample processor 318 facilitates sampling of data units being forwarded without interfering with the normal forwarding of the data unit. Samples 332 can be collected by the sample processor 318 and then provided to a host processor (e.g., CPU), such as by transmission via a select transmit port. For some embodiments, individual samples that may have been attached to a data unit during processing that preceded the execution of the current branch multicast instruction (e.g., the header lookup 214 caused the bit to be set to true for initiating certain sample processing) are not further replicated by the sample processor 318. Accordingly, if branch multicast instruction makes multiple copies of the metadata item, then the branch multicast instruction should cause only one of the copies of the metadata item generated to retain the true bit for sampling, thereby causing the sample processor 318 to generate and delivery only one copy of the data unit to a sample-monitoring or controlling entity.

For various embodiments, multicast copies of a metadata item are prevented from causing generation of further multicast copies of the metadata item. For instance, code branched by the branch multicast instruction can prevented from including its own or another branch multicast instruction.

For some embodiments, the data unit reorderer 320 is configured to ensure that data units are transmitted in order on a per-data flow (or per-flow) basis, where the flow identifier can comprise a data unit's receive port (e.g., of the port manager 102). For multicast replication of metadata items, each copy of a metadata item can be associated with its own flow (e.g., its own transmit port). While it may not be necessary for copies of a given data unit be transmitted in any particular order relative to each other, various embodiments can ensure that two data units received in a certain order via the same receive port (i.e., belonging to the same flow) have their respective copies transmitted in the same order. For instance, the data unit reorderer 320 can ensure that the fourth copy of a given data unit is transmitted before the fourth copy of a subsequent data unit is transmitted.

To maximize efficiency and throughput, the ingress processor (e.g., 104) can permit data units to proceed through the ingress processing pipeline in an order that differs from the one in which the data units are originally introduced into the pipeline. Accordingly, if a series of received data units all belong to different data flows, then those data units can be queued up (enqueued) out of order relative to one another with no negative consequences. For some embodiments, if a series of received data units belong to a single data flow (e.g., received the same receive port), then the data units of that single data flow will be transmitted in the same order in which they are received. The data unit reorderer 320 of various embodiments associates data units with data flows and to ensures that with respect to data units of a single data flow, the data units are delivered to the data unit buffer (e.g., 106) for enqueuing in the same order in which the data units are received by the ingress processor (e.g., 104).

According to some embodiments, the ingress processor associates each received data unit with some form of flow (e.g., according to a receive port), and the data unit reorderer 320 maps the data unit to a particular reorder queue. With respect to data flow association of multicast data units, the data unit reorderer 320 causes replicated metadata items for multicast data units to be ordered according to their association to their data flow (e.g., their receive port), and then according to their multicast index value, which is a value designating which copy a given metadata item represents.

For instance, a metadata item (of a data unit) having a multicast index value of zero can represent the first copy of the metadata item, a metadata item (of a data unit) having a multicast index value of one can represent the second copy of the metadata item, and so on. For some embodiments, the data unit reorderer 320 is first informed of a given data unit via data unit order information 220, which can be provided by the parser (e.g., 212) of the ingress processor. After the given data unit reorderer 320 is informed of the given data unit, the data unit reorderer 320 can presume the given data unit is a unicast data unit (and treat it as such) until the path processor 312 determines that the given data unit is a multicast data unit and executes a branch multicast instruction. In particular, when a branch multicast instruction is executed by the path processor 312, the path processor 312 reports the data unit's multicast radix (i.e., the number of copies of the metadata item to be generated by the lookup result processor 216 to facilitate sufficient replication and forwarding of the multicast data unit). For some embodiments, the data unit's multicast radix is used by the data unit reorderer 320 to determine the number of multicast reordering queues that will be used to order the data unit according to its multicast index.

Figure 4:
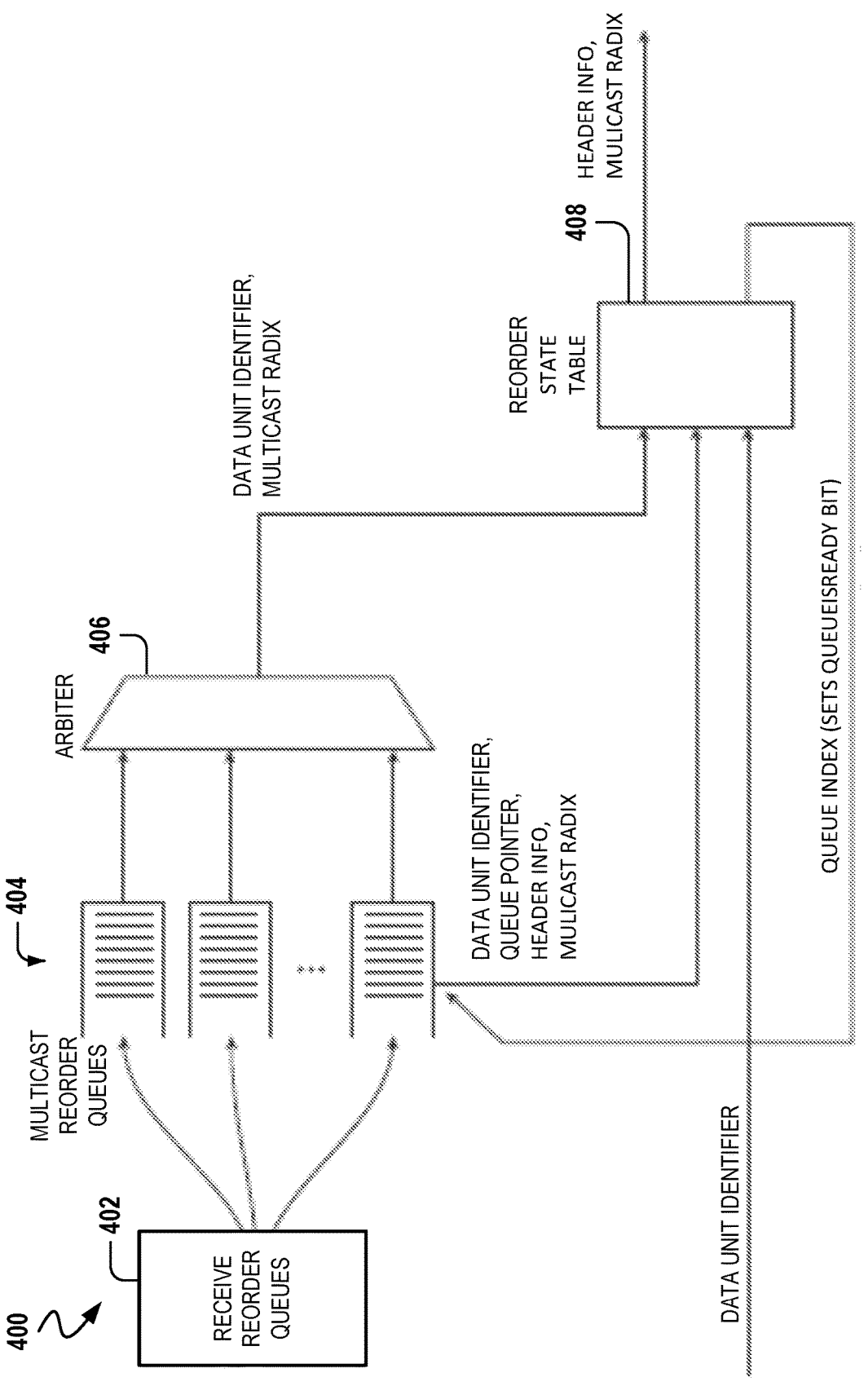
FIG. 4 is a block diagram illustrating an example implementation of a data unit reorderer that supports forwarding multicast data units using ingress processing with multicast data replication, in accordance with some embodiments.

FIG. 4 is a block diagram illustrating an example implementation 400 of the data unit reorderer 320 that supports forwarding multicast data units using ingress processing with multicast data replication, in accordance with some embodiments. As shown, the data unit reorderer 320 comprises a plurality of receive reorder queues 402, a plurality of multicast reorder queues 404, an arbiter 406, and a reorder state table 408. The receive reorder queues 402 can comprise a queue for each receive port, and each of those queues can comprise a variable-length queue. An entry can be added (queued or enqueued) to a tail of a receive reorder queue. Each entry of a receive reorder queue can represent a data unit received by the data unit reorderer 320 via a receive port associated with the receive reorder queue. Additionally, each entry of a receive reorder queue can comprise one or more of: a bit (e.g., queueIsReady bit) which when set to true indicates that the entry is ready to be dequeued when it reaches the head of the receive reorder queue; a data unit identifier of the data unit that the entry represents; a multicast radix, which is a number of (multicast) copies of the metadata item that will eventually be generated for the data unit (e.g., if the data unit is a multicast data unit the value of multicast radix would greater than one); and a pointer to a next entry in the receive reorder queue.

If the entry at the head of a receive reorder queue (of the receive reorder queues 402) has a queueIsReady bit that is set to true, and has a multicast radix that is less than or equal to one, then the data unit associated with the entry (as identified by the data unit identifier) is a unicast data unit, the receive reorder queue is eligible for arbitration for a chance to send the metadata item of the data unit to the data unit buffer (e.g., 106), and the entry is dequeued.

If the entry at the head of a receive reorder queue has a bit that is set to true, and has a multicast radix that is greater than one, then the data unit associated with the entry (as identified by the data unit identifier) is a multicast data unit, then one or more entries are generated using the contents of the current receive reorder queue's entry and the generated entries are enqueued into one or more of the multicast reorder queues 404. Once this is done, the entry at the head of the receive reorder queue is dequeued, and the entry can cause a first copy of the metadata item of the data unit to be delivered to the data unit buffer (e.g., 106).

For some embodiments, the plurality of multicast reorder queues 404 are dependent upon the receive reorder queues 402 (and their respective entries representing received data units) to determine the order in which data units must appear in each of the instances of the multicast reorder queues 404. For various embodiments, there is one multicast reorder queue for each multicast index (e.g., except for index zero). For instance, for a maximum radix of 32, then 31 of the plurality of multicast reorder queues 404 can be used (based on as the first copy of the metadata item being provided to the data unit buffer as soon as a related head entry is dequeued from one of the receive reorder queues 402.

An entry can be added (queued or enqueued) to a tail of a multicast reorder queue. Each entry of a multicast reorder queue can represent a copy of metadata item generated for a give multicast data unit received by the data unit reorderer 320. Additionally, each entry of a multicast reorder queue can comprise one or more of: a bit (e.g., queueIsReady bit) which when set to true indicates that the entry is ready to be dequeued when it reaches the head of the receive reorder queue; a data unit identifier of the data unit that the entry represents; and a pointer to a next entry in the multicast reorder queue. New entries are pushed to (e.g., added to the tail of) one or more of the multicast reorder queues 404 only after an entry associated with a multicast data unit first reaches the head of a receive reorder queue. In particular, a new entry is enqueued into every one of the multicast reorder queues 404 that are a member of a multicast radix group (e.g., multicast reorder queues 1 through multicastRadix−1).

For some embodiments, an entry of the reorder state table 408 stores each metadata item generated and is indexed by the data unit identifier. Additionally, an entry of the reorder state table 408 can store a pointer to one or more queue entries associated with each copy of each data unit. For instance, the pointer can either point to a single entry in one of the receive reorder queues 402 (e.g., single entry for a unicast data unit) or to a list of pointers (e.g., multicastQueuePointers) into a dedicated set of multicast reorder queue entry pointers to entries in the multicast reorder queues 404. A single flag bit (e.g., isMulticast) can indicate what the pointer points to. An example entry of the reorder state table 408 comprises one or more of: header information (e.g., metadata required for delivery to the data unit buffer); a pointer to one or more queue entries; a bit that indicates whether the data unit associated with the entry is a multicast data unit. For some embodiments, the reorder state table 408 provides metadata item storage (indexed by data unit identifier), and the entry enables a data unit's one or more queue entries to be directly address using the pointer in the reorder state table entry (e.g., so that the data unit's queue management parameter values can be updated while those queue entries are somewhere between the tail and the head of a queue).

For various embodiments, the reorder state table 408 is accompanied by a memory that holds linked lists of multicast queue pointers. This structure can use a free-list type of storage allocation scheme. Each allocated entry can store a single pointer to a multicast reorder queue entry, and can also store a pointer to the next location within the same memory.

The order in which multicast copies of metadata items arrive at the data unit buffer (e.g., 106) can be guaranteed to be the same as the order in which a branch multicast instruction generates the copies. In doing so, only one copy of a metadata item can exist at one time, and that copy of the metadata item must be delivered to the data unit buffer before the next copy of the metadata item may be generated. Accordingly, if the linked list of multicast queue pointers is established in order (e.g., multicastIndex value 0 first), then the list can be walked as multicast copies of the metadata item are delivered to the data unit buffer.

Figure 5:
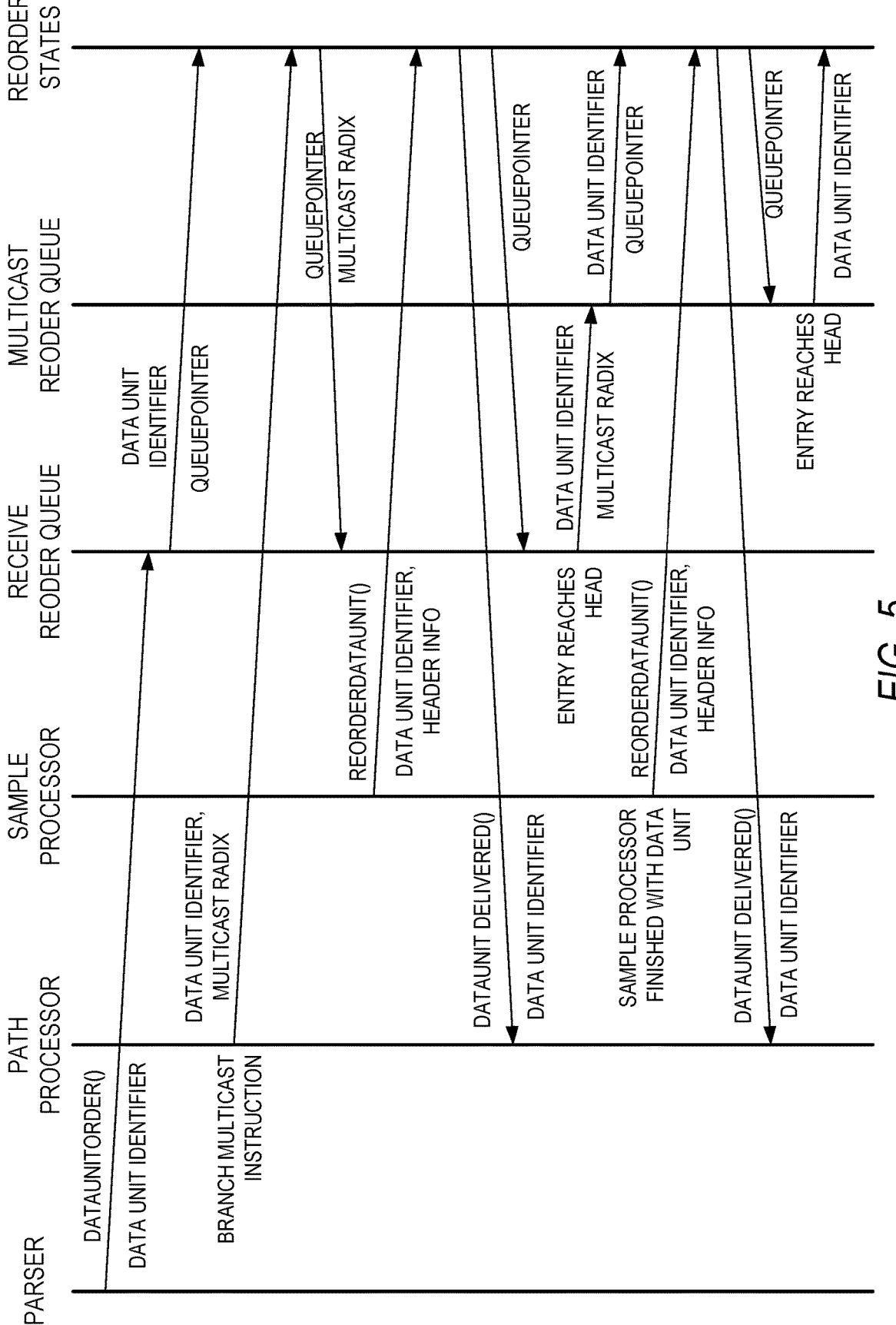
FIG. 5 is a diagram illustrating operations and interaction with respect to an example data unit reorderer, in accordance with some embodiments.

FIG. 5 is a diagram illustrating operations and interaction with respect to the data unit reorderer 320, in accordance with some embodiments. During operation of the data unit reorderer 320, when a function (e.g., dataUnitOrder( )) is called to alert the data unit reorderer 320 of a new data unit that has just entered the parser (e.g., 212) for the first time, a new queue entry is made in one of the receive reorder queues 402 associated with the data unit's receive port. The new queue entry can be generated by allocating a queue storage location from a shared free pool, and the new entry can be linked to the receive reorder queue's current tail entry. A pointer to the new queue entry is also written to the reorder state table 408, the data unit's metadata item is stored at the location of the reorder state table 408 pointed to by the data unit identifier.

As described herein, copies of a metadata item can be created through the execution of a branch multicast instruction by the path processor (e.g., 212). The execution of this instruction can set a multicast radix value of a metadata item of multicast data unit to a value that is greater than one. The multicast radix value can be delivered along with the first copy of the metadata item via a call to reorderDataUnit( ), and its data unit identifier can be used to access the reorder state table 408 to fetch the pointer value that points to the data unit's receive reorder queue entry, which can used to set the queue entry's queueIsReady bit to true. This can make the receive reorder queue in which the entry resides eligible for arbitration for servicing when that queue entry is at the queue's head.

When the data unit's entry arrives at the head of its respective receive reorder queue, the entry is dequeued and a first copy of the metadata item is delivered to the data unit buffer (e.g., 106). Additionally, the multicast radix value contained in the entry is also tested and, if found to be greater than one, the just-dequeued receive reorder queue entry is used to generate a series of entries that are enqueued into one or more of the multicast reorder queues 404. The number of multicast reorder queues that receive an entry is determined by the multicast radix value. For instance, assuming that the first copy of the metadata item has been delivered to the data unit buffer, multicastRadix−1 entries can be generated and added to multicastRadix−1 multicast reorder queues of the plurality of multicast reorder queues 404 to queue up delivery of the remaining copies of the metadata item to the data unit buffer; there is no multicast reorder queue that corresponds to the multicast index value of zero because the copy of the metadata item with its multicast index value set to zero resided in the receive reorder queue and has already been delivered to the data unit buffer.

As each entry is pushed onto its respective multicast reorder queue, a pointer to the entry is added to a linked list of pointers that is linked to the data unit's entry in the reorder state table 408. As additional copies of the metadata item arrive at the data unit reorderer 320, the linked list of queue entry pointers is advanced so that the first additional copy hits queue number one, the second hits queue number two, and so on. Each of these queue updates can comprise setting the entry's queueIsReady bit to true, thereby enabling the multicast reorder queue for arbitration when the entry corresponding to the copy of the metadata item reaches the head of its multicast reorder queue.

To facilitate delivery of metadata items from the data unit reorderer 320 to the data unit buffer (e.g., 106), the receive reorder queues 402 and the multicast reorder queues 404 of the data unit reorderer 320 can be periodically serviced (e.g., serviced in a round-robin fashion). For some embodiments, each of the reorder queues has a head from which entries are retrieved (e.g., dequeued) and a tail that receives (e.g., enqueues) entries for the reorder queue. When a reorder queue is serviced, a given entry at the head of the reorder queue is checked by the arbiter 406 to determine if it is ready for arbitration (e.g., ready for retrieval or fetching by the arbiter 406 to be outputted by the data unit reorderer 320 via the reorder state table 408) and, if so, the given entry is retrieved (e.g., fetched) and dequeued from the applicable queue. An entry of one of the receive reorder queues 402 can be ready to be dequeued and corresponding entries generated and added to one or more of the multicast reorder queues 404 when a bit (e.g., queueIsReady bit) contained in the entry is set to true. An entry of one of the multicast reorder queues 404 can be eligible for arbitration, dequeued from the queue, and retrieved by the arbiter 406 when a bit (e.g., queueIsReady bit) contained in the entry is set to true. When the given entry is retrieved and dequeued, the data unit identifier contained in the entry value is used to fetch the data unit's metadata item from the reorder state table 408.

For some embodiments, the receive reorder queues 402, the multicast reorder queues 404 of the data unit reorderer 320, and related structures are all self-purging. For instance, once a final copy of the metadata item for a given data unit has been delivered to the data unit buffer (e.g., 106), the normal processing of queues (e.g., and other linked lists) can return those resources for reuse and prepare data unit reorderer 320 for one or more metadata items for the next data unit (e.g., which may happen to use the same data unit identifier value).

FIG. 6 is a flowchart illustrating an example method 600 for forwarding multicast data units using ingress processing with multicast data replication, in accordance with some embodiments. It will be understood that example methods described herein may be performed by various components (e.g., functional or circuit components). For instance, the methods 600 can be performed by one or more functional components of the data unit forwarding system 100 described with respect to FIG. 1. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to the method 600 of FIG. 6, at operation 602, a port manager (e.g., 102) of a forwarding network device receives a data unit via a select receive port of a set of receive ports, where the data unit comprises a header portion and a non-header portion. For instance, the forwarding network device can receive data units from a transmitting network device, and the port manager is configured to receive the data unit via the select receive port. Additionally, at operation 604, the port manager assigns a data unit identifier to the data unit. The port manager can be configured to provide the header portion of the data unit to an ingress processor (e.g., 104) of the forwarding network device, and provide the entire data unit to a data unit buffer (e.g., 106) of the forwarding network device. Further, the port manager can be configured to provide the assigned data unit identifier to the ingress processor, the data unit buffer, or both.

At operation 606, ingress processor generates a metadata item for the data unit by analyzing the header portion. For some embodiments, the metadata item describes a network destination of the data unit, and the metadata item comprises the data unit identifier. Then, at operation 608, determines whether the network destination described by the metadata item is a multicast group of network devices (e.g., the data unit comprises a multicast network address). In response to the network destination not being a multicast group of network devices, the ingress processor (and the remainder of the data unit processing pipeline) can handle (e.g., process) the data unit as a unicast data unit. However, in response to the network destination being a multicast group of network devices, at operation 610, the ingress processor determines a plurality of different network paths for the data unit based on the metadata item, where each different network path in the plurality of different network paths comprises information for forwarding the data unit to at least one network device in the multicast group (e.g., (which permit the data unit to get closer to the network devices of the multicast group).

For operation 612, the ingress processor generates a plurality of replicated metadata items that corresponds to the plurality of different network paths, where each replicated metadata item represents a copy of the metadata item that is updated based on a corresponding network path in the plurality of different network paths (e.g., the resulting copies differ with respect to certain values that reflect the differences in the network paths).

During operation 614, the data unit buffer receives the data unit identifier and the data unit from the port manager. At operation 616, the data unit buffer uses the data unit identifier and the data unit to store a single copy of the data unit at a storage location on the data unit buffer that is referenceable (e.g., accessible using the) by the data unit identifier. Additionally, at operation 618, the data unit buffer receives, by the data unit buffer, the plurality of replicated metadata items from the ingress processor. For instance, each of the replicated metadata items is individually received by the data unit buffer as the ingress processor serially outputs (e.g., delivers) them. For some embodiments, after generating a first replicated metadata item of the plurality of replicated metadata items, the ingress processor delivers the first replicated metadata item to the data unit buffer prior to generating a second replicated metadata item of the plurality of replicated metadata items.

Eventually, at operation 620, the data unit buffer causes forwarding of the data unit using the single copy of the data unit (stored at the storage location on the data unit buffer) and the plurality of replicated metadata items stored on the data unit buffer. For instance, the data unit buffer can cause the forwarding by, for each individual metadata item of the plurality of replicated metadata items, determining (e.g., identifying or selecting) an individual output queue of the set of output queues based on the individual metadata item. The data unit buffer can queue the individual metadata item in the individual output queue, where the data unit identifier of the individual metadata item associates the individual metadata item with the data unit stored at the storage location. Additionally, the data unit buffer can queue an individual pointer to the storage location of the single copy of the data unit in the individual output queue (e.g., queue it before or after the queued metadata item), where the queued individual metadata item and the queued pointer enable forwarding of a copy of the data unit based on the queued individual metadata item.

Subsequently, at operation 622, an egress processor of the forwarding network device receives a select pointer from a select output queue of the data unit buffer, and at operation 624, receives a select metadata item from the select output queue. Based on the received select pointer, at operation 626, the egress processor retrieves a select data unit referenced by the select pointer. Thereafter, at operation 628, the egress processor processes the select data unit for transmission based on the select metadata item.

Figure 7:
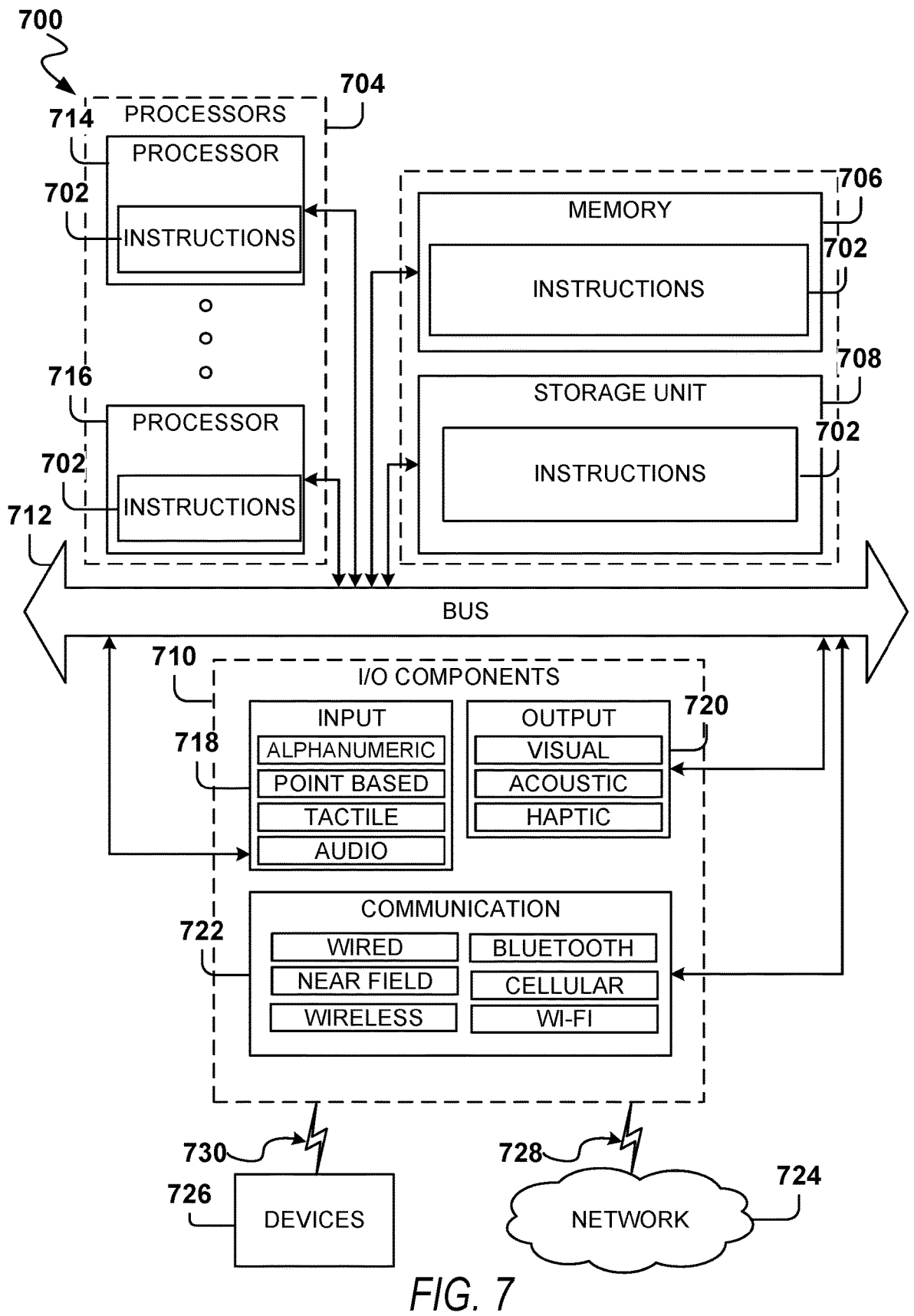
FIG. 7 is a block diagram illustrating components of an example machine that can use one or more embodiments discussed herein.

FIG. 7 is a block diagram illustrating components of an example machine 700 that can use one or more embodiments discussed herein. Specifically, FIG. 7 shows a diagrammatic representation of the machine 700 in the example form of a system, within which instructions 702 (e.g., software, a program, an application, an applet, an app, a driver, or other executable code) for causing the machine 700 to perform one or more operations that may make use of one or more of the methodologies discussed herein. For example, the instructions 702 include executable code that causes the machine 700 to execute one or more operations that cause a network layer device (e.g., MAC layer device) of the machine 700 (e.g., embodied by communication components 722) to perform the method 600. The machine 700 may be coupled (e.g., networked) to other machines.

By way of non-limiting example, the machine 700 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 702, sequentially or otherwise, that specify actions to be taken by the machine 700. Further, while only a single machine 700 is illustrated, the term "machine" shall also be taken to include a collection of machines 700 that individually or jointly execute the instructions 702.

The machine 700 may include processors 704, memory 706, a storage unit 708, and I/O components 710, which may be configured to communicate with each other such as via a bus 712. In some embodiments, the processors 704 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 714 and a processor 716 that may execute the instructions 702. The term "processor" is intended to include multi-core processors 704 that may comprise two or more independent processors (sometimes referred to as "cores") that may execute instructions 702 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 706 (e.g., a main memory or other memory storage) and the storage unit 708 are both accessible to the processors 704 such as via the bus 712. The memory 706 and the storage unit 708 store the instructions 702. The instructions 702 may also reside, completely or partially, within the memory 706, within the storage unit 708, within at least one of the processors 704 (e.g., within the processor's cache memory), or any suitable combination thereof, during execution thereof by the machine 700. Accordingly, the memory 706, the storage unit 708, and the memory of the processors 704 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 702. The term "machine-readable medium" shall also be taken to include any medium, or combination of multiple media, that is capable of storing instructions (e.g., instructions 702) for execution by a machine (e.g., machine 700), such that the instructions, when executed by one or more processors of the machine (e.g., processors 704), cause the machine to perform one or more operations that makes use of one or more of the methodologies described herein (e.g., the method 600). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 710 may include a wide variety of components to receive input, provide output, produce output, transmit information, exchange information, capture measurements, and so on. The specific I/O components 710 that are included in a particular machine 700 will depend on the type of the machine 700. For example, portable machines such as mobile phones will likely include a touch input device or other such input mechanisms, while a headless server machine will likely not include such a touch input device. It will be appreciated that the I/O components 710 may include many other components that are not specifically shown in FIG. 7. The I/O components 710 are grouped according to functionality merely for simplifying the following discussion and the grouping is in no way limiting. In various embodiments, the I/O components 710 may include input components 718 and output components 720. The input components 718 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 710 may include communication components 722 operable to couple the machine 700 to a network 724 or devices 726 via a coupling 728 and a coupling 730 respectively. For example, the communication components 722 may include a network interface component or another suitable device to interface with the network 724. In further examples, the communication components 722 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 726 may be another machine or any of a wide variety of peripheral devices. According to various embodiments, the communication components 722 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:

a port manager comprising a set of receive ports to receive data packets from a transmitting network device, the port manager being configured to receive a data packet via a select receive port of the set of receive ports and to assign a data packet identifier to the data packet, the data packet comprising a header portion and a non-header portion;

an ingress processor configured to perform operations comprising:

receiving the data packet identifier and the header portion of the data packet from the port manager;

generating a metadata item for the data packet by analyzing the header portion, the metadata item being separate from the data packet, the metadata item describing a network destination of the data packet, the metadata item comprising the data packet identifier;

determining whether the network destination is a multicast group of network devices; and in response to the network destination being a multicast group of network devices:

determining a plurality of different network paths for the data packet based on the metadata item, each different network path in the plurality of different network paths comprising information for forwarding the data packet to at least one network device in the multicast group; and generating, for the data packet, a plurality of updated metadata items that corresponds to the plurality of different network paths, each updated metadata item of the plurality of updated metadata items representing a copy of the metadata item that is updated based on a corresponding network path in the plurality of different network paths, the plurality of updated metadata items being iteratively generated such that after generating a first updated metadata item of the plurality of updated metadata items, the ingress processor delivers the first updated metadata item to a data packet buffer prior to generating a second updated metadata item of the plurality of updated metadata items; and the data packet buffer comprising a set of output queues, the data packet buffer being configured to perform operations comprising:

receiving the data packet identifier and the data packet from the port manager;

storing a single copy of the data packet at a select storage location on the data packet buffer that is referenceable by the data packet identifier;

receiving the plurality of updated metadata items from the ingress processor; and causing forwarding of the data packet using the single copy of the data packet and the plurality of updated metadata items stored on the data packet buffer, the causing of the forwarding comprising, for each individual updated metadata item of the plurality of updated metadata items received from the ingress processor:

queuing the individual updated metadata item in an individual output queue of the set of output queues that is associated with the data packet identifier from the individual updated metadata item, the individual updated metadata item being stored in the individual output queue in a different storage location from the select storage location storing the single copy of the data packet; and generating and enqueuing a pointer to the storage location of the single copy of the data packet in the individual output queue, the pointer associating the individual updated metadata item queued in the individual output queue with the single copy of the data packet at the select storage location.

2. The system of claim 1, wherein for each individual metadata item of the plurality of updated metadata items:

determining, based on the individual metadata item, the individual output queue of the set of output queues.

3. The system of claim 2, comprising:

an egress processor configured to perform operations comprising:

receiving a select pointer from a select output queue of the data packet buffer;

receiving a select metadata item from the select output queue;

retrieving a select data packet referenced by the select pointer; and processing the select data packet for transmission based on the select metadata item.

4. The system of claim 3, wherein the port manager comprises a set of transmit ports, and wherein the processing of the select data packet for transmission based on the select metadata item comprises:

providing the select data packet to the port manager to be transmitted via a select transmit port in the set of transmit ports.

5. The system of claim 2, wherein the data packet is a first data packet received via the select receive port, wherein the port manager receives a second data packet via the select receive port after the port manager receives the first data packet via the select receive port, wherein the plurality of updated metadata items is a first plurality of updated metadata items, and wherein the ingress processor comprises:

a data packet reorder component configured to queue the first plurality of updated metadata items of the first data packet and a second plurality of updated metadata items of the second data packet such that the first plurality of updated metadata items is delivered to the data packet buffer prior to the second plurality of updated metadata items being delivered to the data packet buffer.

6. The system of claim 5, wherein the data packet reorder component is configured to serially receive each separate metadata item of the first plurality of updated metadata items as it is generated by ingress processor, and wherein the data packet reorder component queues a serially received metadata item according to a receive port associated with the serially received metadata item and then queues the serially received metadata item according to a multicast index value associated with the serially received metadata item.

7. The system of claim 1, wherein the header portion comprises a header byte string.

8. The system of claim 1, wherein the data packet is defined by an IEEE network standard.

9. A method comprising:

receiving, by a port manager of a forwarding network device, a data packet via a select receive port of a set of receive ports, the data packet comprising a header portion and a non-header portion;

assigning, by the port manager, a data packet identifier to the data packet;

generating, by an ingress processor of the forwarding network device, a metadata item for the data packet by analyzing the header portion, the metadata item being separate from the data packet, the metadata item describing a network destination of the data packet, the metadata item comprising the data packet identifier;

determining, by the ingress processor, that the network destination is a multicast group of network devices;

in response to determining that the network destination is a multicast group of network devices:

determining, by the ingress processor, a plurality of different network paths for the data packet based on the metadata item, each different network path in the plurality of different network paths comprising information for forwarding the data packet to at least one network device in the multicast group; and generating, by the ingress processor for the data packet, a plurality of updated metadata items that corresponds to the plurality of different network paths, each updated metadata item of the plurality of updated metadata items representing a copy of the metadata item that is updated based on a corresponding network path in the plurality of different network paths, the plurality of updated metadata items being iteratively generated such that after generating a first updated metadata item of the plurality of updated metadata items, the ingress processor delivers the first updated metadata item to a data packet buffer prior to generating a second updated metadata item of the plurality of updated metadata items;

receiving, by the data packet buffer of the forwarding network device, the data packet identifier and the data packet from the port manager;

storing, by the data packet buffer, a single copy of the data packet at a select storage location on the data packet buffer that is referenceable by the data packet identifier;

receiving, by the data packet buffer, the plurality of updated metadata items from the ingress processor; and causing, by the data packet buffer, forwarding of the data packet using the single copy of the data packet and the plurality of updated metadata items stored on the data packet buffer, the causing of the forwarding comprising, for each individual updated metadata item of the plurality of updated metadata items received from the ingress processor:

queuing the individual updated metadata item in an individual output queue of the set of output queues that is associated with the data packet identifier from the individual updated metadata item, the individual updated metadata item being stored in the individual output queue in a different storage location from the select storage location storing the single copy of the data packet; and generating and enqueuing a pointer to the storage location of the single copy of the data packet in the individual output queue, the pointer associating the individual updated metadata item queued in the individual output queue with the single copy of the data packet at the select storage location.

10. The method of claim 9, wherein for each individual metadata item of the plurality of updated metadata items:

determining, based on the individual metadata item, an individual output queue of a set of output queues of the data packet buffer.

11. The method of claim 10, comprising:

receiving, by an egress processor of the forwarding network device, a select pointer from a select output queue of the data packet buffer;

receiving, by the egress processor, a select metadata item from the select output queue;

retrieving, by the egress processor, a select data packet referenced by the select pointer; and processing, by the egress processor, the select data packet for transmission based on the select metadata item.

12. The method of claim 11, wherein the port manager comprises a set of transmit ports, and wherein the processing of the select data packet for transmission based on the select metadata item comprises:

providing the select data packet to the port manager to be transmitted via a select transmit port in the set of transmit ports.

13. The method of claim 10, wherein the data packet is a first data packet received via the select receive port, wherein the port manager receives a second data packet via the select receive port after the port manager receives the first data packet via the select receive port, wherein the plurality of updated metadata items is a first plurality of updated metadata items, and wherein the ingress processor comprises:

a data packet reorder component configured to queue the first plurality of updated metadata items of the first data packet and a second plurality of updated metadata items of the second data packet such that the first plurality of updated metadata items is delivered to the data packet buffer prior to the second plurality of updated metadata items being delivered to the data packet buffer.

14. The method of claim 13, wherein the data packet reorder component is configured to serially receive each separate metadata item of the first plurality of updated metadata items as it is generated by ingress processor, and wherein the data packet reorder component queues a serially received metadata item according to a receive port associated with the serially received metadata item and then queues the serially received metadata item according to a multicast index value associated with the serially received metadata item.

15. The method of claim 9, wherein the header portion comprises a header byte string.

16. A non-transitory computer-readable medium comprising instructions that, when executed by a hardware processor of a forwarding network device, cause the forwarding network device to perform operations comprising:

receiving, by a port manager of the forwarding network device, a data packet via a select receive port of a set of receive ports, the data packet comprising a header portion and a non-header portion;

assigning, by the port manager, a data packet identifier to the data packet;

generating, by an ingress processor of the forwarding network device, a metadata item for the data packet by analyzing the header portion, the metadata item being separate from the data packet, the metadata item describing a network destination of the data packet, the metadata item comprising the data packet identifier;

determining, by the ingress processor, whether the network destination is a multicast group of network devices;

in response to determining that the network destination is a multicast group of network devices:

determining, by the ingress processor, a plurality of different network paths for the data packet based on the metadata item, each different network path in the plurality of different network paths comprising information for forwarding the data packet to at least one network device in the multicast group; and generating, by the ingress processor for the data packet, a plurality of updated metadata items that corresponds to the plurality of different network paths, each updated metadata item of the plurality of updated metadata items representing a copy of the metadata item that is updated based on a corresponding network path in the plurality of different network paths, the plurality of updated metadata items being iteratively generated such that after generating a first updated metadata item of the plurality of updated metadata items, the ingress processor delivers the first updated metadata item to a data packet buffer prior to generating a second updated metadata item of the plurality of updated metadata items;

receiving, by the data packet buffer of the forwarding network device, the data packet identifier and the data packet from the port manager;

storing, by the data packet buffer, a single copy of the data packet at a select storage location on the data packet buffer that is referenceable by the data packet identifier;

receiving, by the data packet buffer, the plurality of updated metadata items from the ingress processor; and causing, by the data packet buffer, forwarding of the data packet using the single copy of the data packet and the plurality of updated metadata items stored on the data packet buffer, the causing of the forwarding comprising, for each individual updated metadata item of the plurality of updated metadata items received from the ingress processor:

queuing the individual updated metadata item in an individual output queue of the set of output queues that is associated with the data packet identifier from the individual updated metadata item, the individual updated metadata item being stored in the individual output queue in a different storage location from the select storage location storing the single copy of the data packet; and generating and enqueuing a pointer to the storage location of the single copy of the data packet in the individual output queue, the pointer associating the individual updated metadata item queued in the individual output queue with the single copy of the data packet at the select storage location.

17. The non-transitory computer-readable medium of claim 16, wherein for each individual metadata item of the plurality of updated metadata items:

determining, based on the individual metadata item, an individual output queue of a set of output queues of the data packet buffer.

18. The non-transitory computer-readable medium of claim 17, wherein the operations comprise:

receiving, by an egress processor of the forwarding network device, a select pointer from a select output queue of the data packet buffer;

receiving, by the egress processor, a select metadata item from the select output queue;

retrieving, by the egress processor, a select data packet referenced by the select pointer; and processing, by the egress processor, the select data packet for transmission based on the select metadata item.

19. The non-transitory computer-readable medium of claim 18, wherein the port manager comprises a set of transmit ports, and wherein the processing of the select data packet for transmission based on the select metadata item comprises:

providing the select data packet to the port manager to be transmitted via a select transmit port in the set of transmit ports.

20. The non-transitory computer-readable medium of claim 17, wherein the data packet is a first data packet received via the select receive port, wherein the port manager receives a second data packet via the select receive port after the port manager receives the first data packet via the select receive port, wherein the plurality of updated metadata items is a first plurality of updated metadata items, and wherein the ingress processor comprises:

a data packet reorder component configured to queue the first plurality of updated metadata items of the first data packet and a second plurality of updated metadata items of the second data packet such that the first plurality of updated metadata items is delivered to the data packet buffer prior to the second plurality of updated metadata items being delivered to the data packet buffer.

* * * * *